(12) United States Patent
Ridgway

(10) Patent No.: US 8,780,169 B1
(45) Date of Patent: Jul. 15, 2014

(54) PHONE LANDLINE AND VIDEOPHONE HANDSET ALLOWING SIMULTANEOUS EXCHANGE OF VIDEO IMAGES OVER AN INTERNET NETWORK

(76) Inventor: Mylon D. Ridgway, Highland, CA (US)

( * ) Notice: Subject to any disclaimer, the term of this patent is extended or adjusted under 35 U.S.C. 154(b) by 306 days.

(21) Appl. No.: 13/272,626

(22) Filed: Oct. 13, 2011

(51) Int. Cl.
*H04N 7/14* (2006.01)
(52) U.S. Cl.
USPC .................................................. 348/14.12
(58) Field of Classification Search
USPC ................ 348/14.01–14.02, 14.09, 14.12; 370/252
See application file for complete search history.

(56) References Cited

U.S. PATENT DOCUMENTS

| | | | |
|---|---|---|---|
| 6,636,506 B1 | 10/2003 | Fan | |
| 6,704,580 B1 | 3/2004 | Fintel | |
| 6,980,546 B2 | 12/2005 | Purpura et al. | |
| D556,190 S | 11/2007 | Liu et al. | |
| 7,764,784 B2 | 7/2010 | Sewall | |
| 2007/0036154 A1 | 2/2007 | Lipman | |
| 2008/0055399 A1* | 3/2008 | Woodworth et al. | 348/14.12 |
| 2008/0056145 A1* | 3/2008 | Woodworth | 370/252 |
| 2011/0043601 A1* | 2/2011 | Dye et al. | 348/14.09 |
| 2012/0019609 A1* | 1/2012 | Chang et al. | 348/14.01 |
| 2012/0033028 A1* | 2/2012 | Murphy et al. | 348/14.02 |

* cited by examiner

*Primary Examiner* — Mohammad Islam

(57) ABSTRACT

The phone landline and videophone handset system is related to landline videophone devices, videophone methods, and videophone systems for establishing video communications between two or more persons through an internet network, wherein a telephone landline is used for the voice transmission and the internet videophone is used for visual transmission.

4 Claims, 3 Drawing Sheets

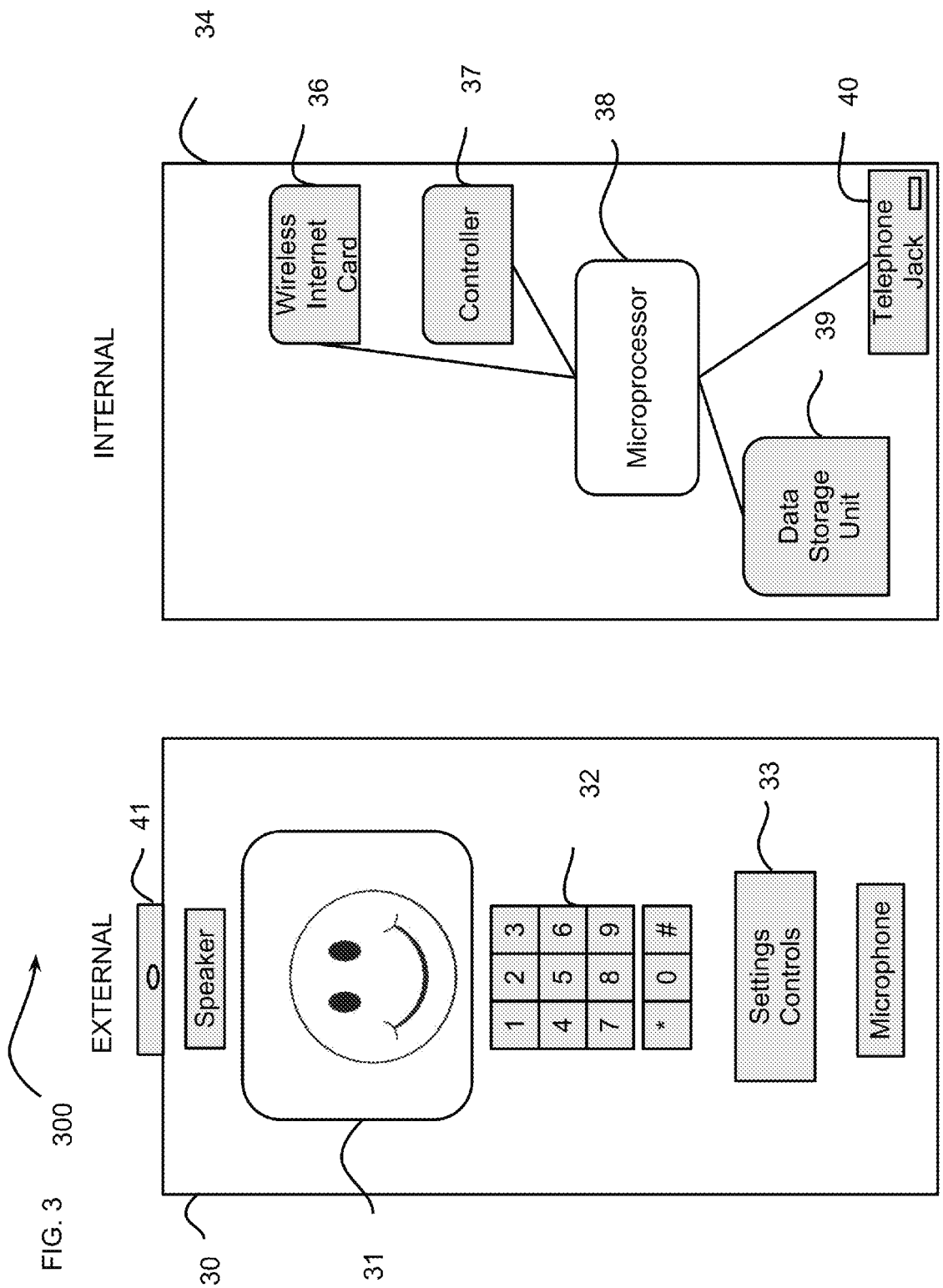

PHONE LANDLINE AND VIDEOPHONE HANDSET ALLOWING SIMULTANEOUS EXCHANGE OF VIDEO IMAGES OVER AN INTERNET NETWORK

BACKGROUND OF THE INVENTION

The present invention is related to videophone devices, videophone methods, and videophone systems for establishing video communications between two or more persons through an internet network, wherein a telephone landline is used for voice transmission and the Internet videophone is used for visual transmission.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 3 depicts a possible embodiment for the physical architecture of the videophone discussed herein and the various electronic components located on said videophone.

DESCRIPTION OF PREFERRED EMBODIMENTS

Figure 1:
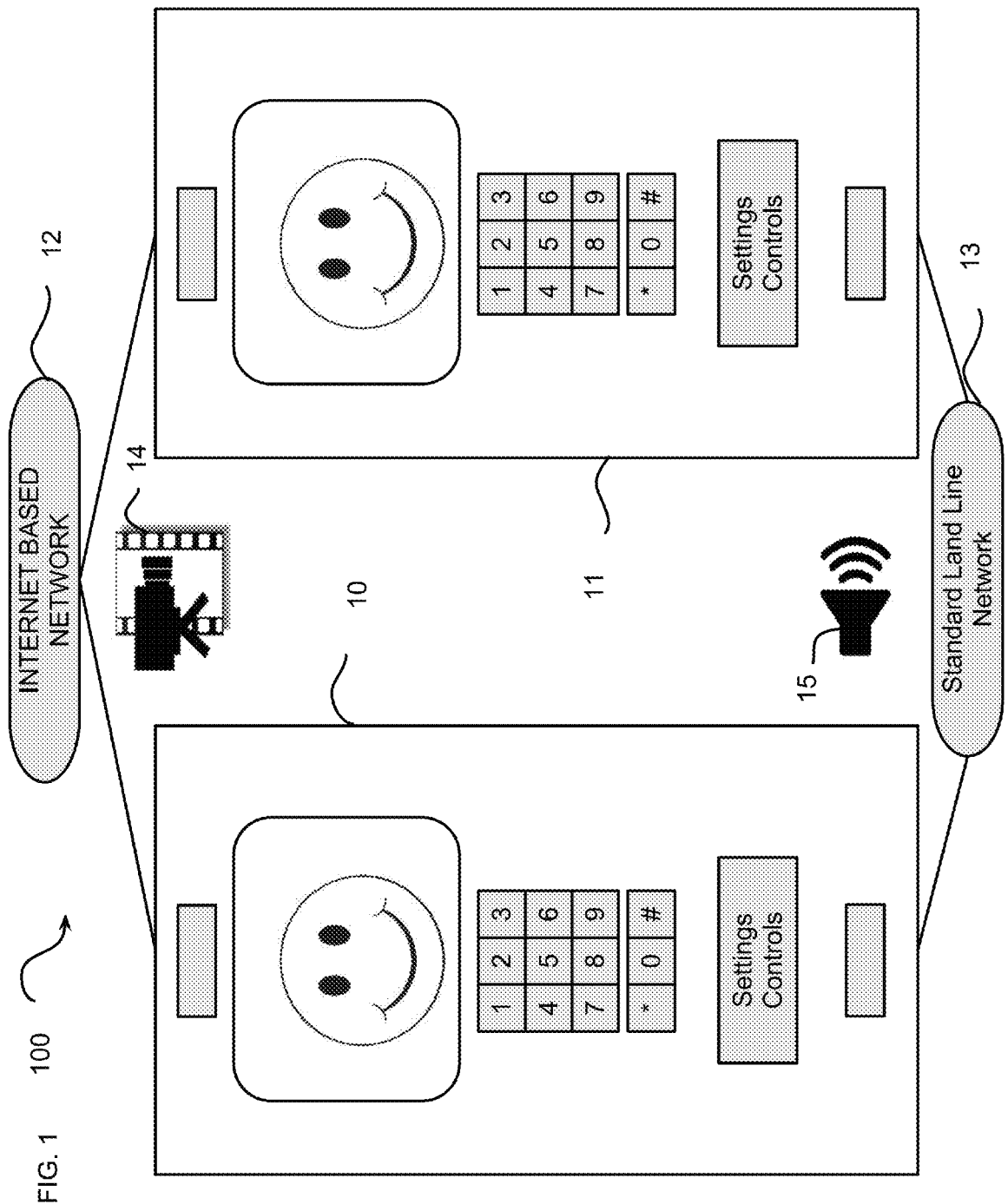
FIG. 1 shows a systems level drawing of a first videophone and second videophone and how said devices communicate with one another over an internet network and preexisting landline networks.
Figure 2:
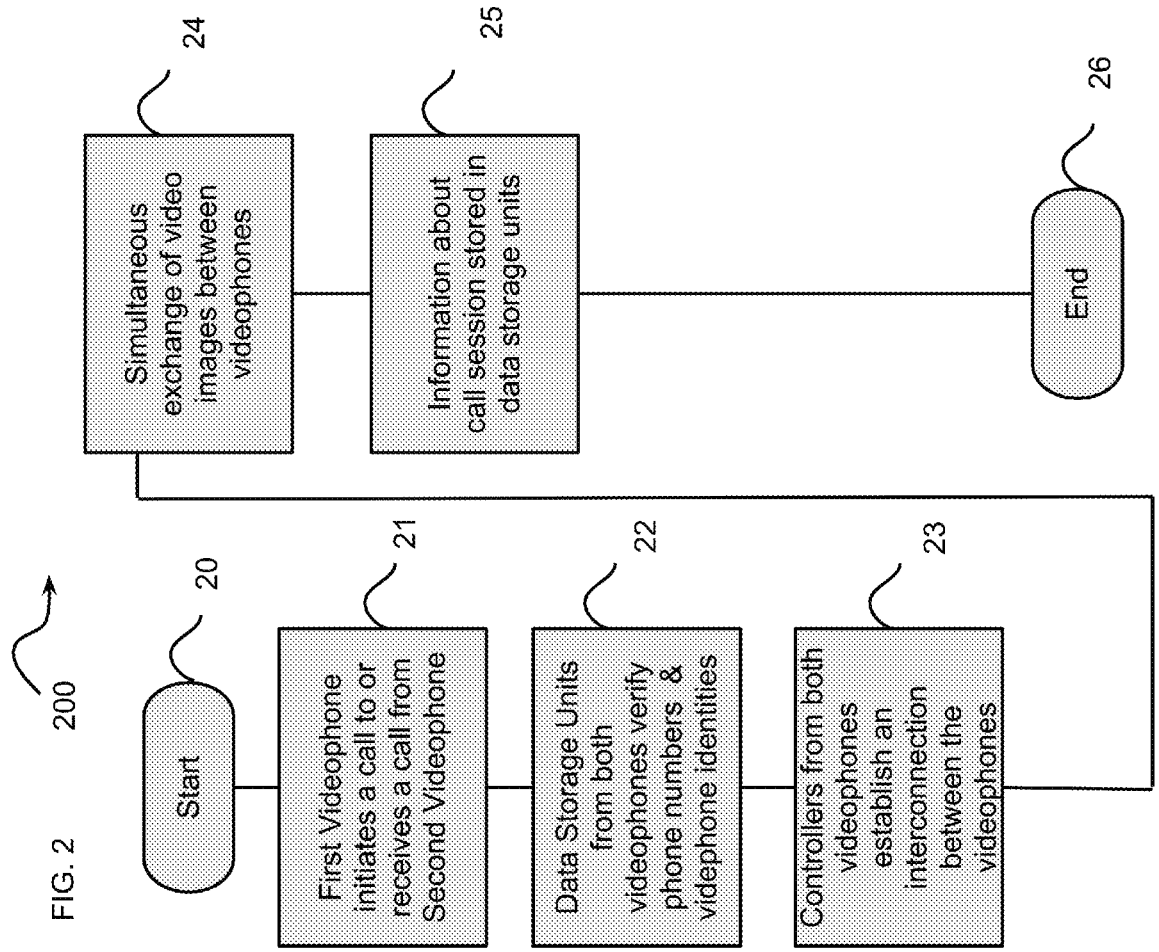
FIG. 2 shows a potential process flow corresponding to the method set forth in claim 5.

Referring now to FIG. 1-3, the present invention primarily features a videophone system comprising a plurality of videophones, including a first videophone 10 and at least one second videophone 11 having a predetermined phone number, and in some embodiments the system further comprises:
(a) a first videophone 10, configured to perform, after issuing or receiving a call request to or from a second videophone 11 having a predetermined phone number, a simultaneous exchange of video images 14 with the second videophone 11 through an internet network 12;
(b) the second videophone 11;
(c) a data storage unit 39, housed within the first videophone 10 and operatively connected to the same, whereby the data storage unit 39 is configured to store information acquired by the simultaneous exchange of video images 14, information corresponding to the first videophone and a plurality of other videophones, and also store a plurality of phone numbers which identify the first videophone 10 and other videophones;
(d) a controller 37, configured to establish an interconnection with the second videophone 11, over the internet network 12, by using the information stored in the data storage unit 39 upon issuing or receiving a call request to or from the second videophone 11 having the predetermined phone number to thereby make a subsequent phone call to the second videophone 11;
(e) wireless internet card 36, operatively connected to said first videophone 10, which enables the first videophone 10 to transmit and receive visual images 14 over the internet network 12 to and from the second videophone 11; and a
(f) microprocessor 38, operatively connected to the wireless internet card 36, the data storage unit 39, and the controller 37 where said microprocessor 38 is configured to enable the simultaneous exchange of video images 14 by querying the data storage unit 39 for information about the first videophone 10 and the second videophone 11, enable the controller 37 to establish an interconnection between the first videophone 10 and the second videophone 11, and enable the wireless internet card 36 to transmit visual images 14 through the Internet network 14 by and between the first videophone 10 and second videophone 11.

wherein after issuing or receiving a call request to or from the at least one second videophone 11, the first videophone 10 is configured to perform a simultaneous exchange of video images 14 with the at least one second videophone 11 through an internet network 12 and to transmit and receive image data 14 to and from at least one second videophone 11 through the internet network 12 to thereby make a phone call involving the display of the image data 14 received from the at least one second videophone 11, and wherein where said first videophone 10 is further configured to be compatible with and connectable to a land line network 13 whereby audio communications 15 by and between the first videophone 10 and second videophone 11 are conducted over said land line network 13 and not over the internet network 12.

The present invention can enable users, currently utilizing land line telephone networks, to transmit visual images between one another over an internet network using a simple electronic telephone handset which is still compatible with and connectable to a regular telephone land line network.

The invention, as set forth in claim 1 and as stated herein does not purport to claim the communication of audio between videophones, rather, only the exchange of visual images is sought. Thus, the present invention can utilize preexisting land line telephone networks to enable audio communication over said networks. This way users do not require costly purchases of new equipment. Rather, all a user requires is the handset and an internet connection.

A basic use of the proposed system can occur follows. A user can connect a local videophone to a landline network as can be done with any ordinary phone. This connection, or installation of the local videophone to the preexisting land line network can immediately enhance the capability of the phone connection because it can enable the simultaneous transmission of visual images to and from the local videophone and other videophones while not requiring additional costly equipment other than the local videophone, or handset.

Next, in order to use the local videophone, the user first initiates a call and dials a phone number of another videophone programmed into the local videophone where information about the remote videophone is stored in the local videophone's data storage unit.

Thereafter, the controller, after verifying that the remote videophone is the intended recipient of the call, can establish an interconnection, over an internet network, between the two videophones, which allows a simultaneous exchange of visual images. At the same time, an audio call is also established over the land line network because the phone number dialed by the local videophone can be the same phone number used to reach the recipient of the call, or the remote videophone, during an ordinary landline phone call over the landline network. Thus, two connections are established by the calling of the phone number of the remote videophone; (i) an interconnection for the simultaneous exchange of visual images over an internet network, and (ii) an audio connection, or normal call connection established over the regular land line network.

Miniature video cameras, attached to both videophones can capture the visual images in real time which are then exchanged between the videophones. However, as stated herein, audio communications can still be transmitted through the land line network while the simultaneous exchange of video images takes place over the internet network.

Once the interconnection is established the data storage units on both pones store information about the interconnection until the videophone call is terminated.

In some embodiments, the system above could further comprise a remote business server, which stores additional information about the plurality of videophones communicating over the internet network. Said server could contain information to notify videophone users as to what telephone numbers on land line networks are currently also being enhanced by the present invention, or in other words, where other videophones are located so that the videophone users know who they can communicate with visually across said system.

A videophone transmission/reception method comprises a first videophone 10 and a second videophone 11 having a predetermined phone number, wherein after issuing or receiving a call request to or from the second videophone 11, the first videophone 10 is configured to perform a simultaneous exchange of video images 14 with the second videophone 11 through an internet network 12 and to transmit and receive image data 14 to and from the second videophone 11 to thereby make a phone call involving the display of the image data 14 received from the second videophone 11.

The method comprises the first videophone 10 initiating a call to or receiving a call from the second videophone 11, 21. The method further comprises the controller 37 of the first videophone 10 verifying the identity 22 of the second videophone 11, and when it is determined that the second videophone 11 is the second videophone 11, said controller 37, establishes an interconnection 23 with the second videophone 11 by using the information stored in the data storage unit 39. The method further comprises exchanging, simultaneously, visual images 14 over the internet network 12 by and between the first videophone 10 and second videophone 11, 24, and directing the first videophone 10 and the second videophone 11 to mutually store information acquired by the simultaneous exchange of video images 14.

A videophone system comprising a plurality of videophones, including a first videophone 10 and at least one second videophone 11 having a predetermined phone number, said system further comprising a first videophone 10, configured to perform, after issuing or receiving a call request to or from a second videophone 11 having a predetermined phone number, a simultaneous exchange of video images 14 with the second videophone 11 through an internet network 12. The system further comprises the second videophone 11 and a data storage unit 39, housed within the first videophone 10 and operatively connected to the same, whereby the data storage unit 39 is configured to store information acquired by the simultaneous exchange of video images 14, information corresponding to the first videophone and a plurality of other videophones, and also store a plurality of phone numbers which identify the first videophone 10 and other videophones. The system further comprises a controller 37, configured to establish an interconnection with the second videophone 11, over the internet network 12, by using the information stored in the data storage unit 39 upon issuing or receiving a call request to or from the second videophone 11 having the predetermined phone number to thereby make a subsequent phone call to the second videophone 11. The system further comprises a wireless internet card 36, operatively connected to said first videophone 10, which enables the first videophone 10 to transmit and receive visual images 14 over the internet network 12 to and from the second videophone 11, and a microprocessor 38, operatively connected to the wireless internet card 36; the data storage unit 39, and the controller 37 where said microprocessor 38 is configured to enable the simultaneous exchange of video images 14 by querying the data storage unit 39 for information about the first videophone 10 and the second videophone 11, enable the controller 37 to establish an interconnection between the first videophone 10 and the second videophone 11, and enable the wireless internet card 36 to transmit visual images 14 through the internet network 14 by and between the first videophone 10 and second videophone 11. Wherein after issuing or receiving a call request to or from the at least one second videophone 11, the first videophone 10 is configured to perform a simultaneous exchange of video images 14 with the at least one second videophone 11 through an internet network 12 and to transmit and receive image data 14 to and from at least one second videophone 11 through the internet network 12 to thereby make a phone call involving the display of the image data 14 received from the at least one second videophone 11, and wherein where said first videophone 10 is further configured to be compatible with and connectable to a land line network 13 whereby audio communications 15 by and between the first videophone 10 and second videophone 11 are conducted over said land line network 13 and not over the internet network 12.

The disclosures of the following U.S. Patents are incorporated in their entirety by reference herein: U.S. Pat. No. 6,636,506; U.S. Pat. No. 6,704,580; U.S. Patent Application No. 2007/0036154; U.S. Pat. No. 7,764,784; U.S. Pat. No. 6,980,546; U.S. Design Patent No. D556190.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A first videophone (10), configured to perform, after issuing or receiving a call request to or from a second videophone (11) having a predetermined phone number, a simultaneous exchange of video images (14) with the second videophone (11) through an internet network (12), whereby the first videophone (10) is configured to transmit and receive video images (14) to and from the second videophone (11) through the internet network (12) thereby enabling said simultaneous exchange of video images (14), the first videophone (10) comprising:

(a) a data storage unit (39), housed within the first videophone (10) and operatively connected to the same, whereby the data storage unit (39) is configured to store information acquired by the simultaneous exchange of video images (14), information corresponding to the first videophone and a plurality of other videophones, and also store a plurality of phone numbers which identify the first videophone (10) and other videophones; and (b) a controller (37), configured to establish an interconnection with the second videophone (11), over the internet network (12), by using the information stored in the data storage unit (39) upon issuing or receiving a call request to or from the second videophone (11) having the predetermined phone number to thereby make a subsequent phone call to the second videophone (11); and (c) a wireless internet card (36), operatively connected to said first videophone (10), which enables the first videophone (10) to transmit and receive visual images (14) over the internet network (12) to and from the second videophone (11); and (d) a microprocessor (38), operatively connected to the wireless internet card (36), the data storage unit (39), and the controller (37), where said microprocessor (38) is configured to enable the simultaneous exchange of video images (14) by querying the data storage unit (39) for information about the first videophone (10) and the second videophone (11), enable the controller (37) to establish an interconnection between the first videophone (10) and the second videophone (11), and enable the wireless internet card (36) to transmit visual images (14) through the internet network (14) by and between the first videophone (10) and second videophone (11);

wherein said first videophone (10) is further configured to be compatible with and connectable to a land line network (13), whereby audio communications (15) by and between the first videophone (10) and second videophone (11) are conducted over said land line network (13) and not over the internet network (12), wherein the land line network (13) is exclusively for audio communications and the internet network (12) is exclusively for simultaneous exchange of video images (14).

2. The first videophone (10) according to claim 1, wherein the controller (37) is further configured to verify the identity of the second videophone (11), and when it is determined that the second videophone (11) is the second videophone (11), the controller (37) establishes an interconnection with the second videophone (11) by using the information stored in the data storage unit (39).

3. The first videophone (10) of claim 1 further comprising an electronic telephone handset (300), configured to be compatible with and connectable to a telephone land line network (13) via a telephone jack (40); the handset (300) further comprising:

(a) a keypad (32), comprising a series of telephone phone numbers and buttons, located on the face (30) of the handset, which enable a user to dial a phone number and adjust the settings (33) of the first videophone (10); and (b) a color video screen (31), located on the face (30) of the device which enables the first videophone (10) to display visual images (14) of a second user operating the second videophone (11) during the simultaneous exchange of video images (14); and (c) a video camera (41) operatively connected to the wireless internet card (36) and the microprocessor (38) which captures visual images (14) of a user operating the first videophone (10) and transmits said images (14) to a second user operating the second videophone (11).

4. A first videophone (10), configured to perform, after issuing or receiving a call request to or from a second videophone (11) having a predetermined phone number, a simultaneous exchange of video images (14) with the second videophone (11) through an internet network (12), whereby the first videophone (10) is configured to transmit and receive video images (14) to and from the second videophone (11) through the internet network (12) thereby enabling said simultaneous exchange of video images (14), the first videophone (10) consisting of:

(a) a data storage unit (39), housed within the first videophone (10) and operatively connected to the same, whereby the data storage unit (39) is configured to store information acquired by the simultaneous exchange of video images (14), information corresponding to the first videophone and a plurality of other videophones, and also store a plurality of phone numbers which identify the first videophone (10) and other videophones; and (b) a controller (37), configured to establish an interconnection with the second videophone (11), over the internet network (12), by using the information stored in the data storage unit (39) upon issuing or receiving a call request to or from the second videophone (11) having the predetermined phone number to thereby make a subsequent phone call to the second videophone (11); and (c) a wireless internet card (36), operatively connected to said first videophone (10), which enables the first videophone (10) to transmit and receive visual images (14) over the internet network (12) to and from the second videophone (11); and (d) a microprocessor (38), operatively connected to the wireless internet card (36), the data storage unit (39), and the controller (37), where said microprocessor (38) is configured to enable the simultaneous exchange of video images (14) by querying the data storage unit (39) for information about the first videophone (10) and the second videophone (11), enable the controller (37) to establish an interconnection between the first videophone (10) and the second videophone (11), and enable the wireless internet card (36) to transmit visual images (14) through the internet network (14) by and between the first videophone (10) and second videophone (11);

wherein said first videophone (10) is further configured to be compatible with and connectable to a land line network (13), whereby audio communications (15) by and between the first videophone (10) and second videophone (11) are conducted over said land line network (13) and not over the internet network (12), wherein the land line network (13) is exclusively for audio communications and the internet network (12) is exclusively for simultaneous exchange of video images (14).

\* \* \* \* \*